United States Patent

Cross

[11] Patent Number: 5,177,445
[45] Date of Patent: Jan. 5, 1993

[54] METHOD AND APPARATUS FOR DETECTING AND LOCATING A SELECTED NON-METALLIC MATERIAL IN A DETECTION REGION

[75] Inventor: Thomas E. Cross, Nottingham, Great Britain

[73] Assignee: Zetetic International Limited, Nottingham, England

[21] Appl. No.: 678,975

[22] PCT Filed: Oct. 31, 1989

[86] PCT No.: PCT/GB89/01298
§ 371 Date: Jun. 19, 1991
§ 102(e) Date: Jun. 19, 1991

[87] PCT Pub. No.: WO90/05299
PCT Pub. Date: May 17, 1990

[30] Foreign Application Priority Data
Oct. 31, 1988 [GB] United Kingdom .............. 8825435

[51] Int. Cl.$^5$ ............ G01N 22/00; G01R 27/26
[52] U.S. Cl. .................... 324/637; 324/639; 324/642; 324/663; 324/690
[58] Field of Search .......... 324/663, 664, 667, 671, 324/672, 676, 686, 687, 689, 690, 637, 639, 642

[56] References Cited

U.S. PATENT DOCUMENTS

| | | | |
|---|---|---|---|
| 3,255,410 | 6/1966 | Norwich | 324/667 X |
| 4,058,766 | 11/1977 | Vogel et al. | 324/667 |
| 4,322,678 | 3/1982 | Capots et al. | |
| 4,370,611 | 1/1983 | Gregory et al. | |
| 4,710,550 | 12/1987 | Kranbuehl | 324/690 X |

FOREIGN PATENT DOCUMENTS 0001919  5/1979  European Pat. Off. .
2199715A 7/1988  United Kingdom .

Primary Examiner—Jack B. Harvey
Attorney, Agent, or Firm—Watson, Cole, Grindle & Watson

[57] ABSTRACT

Particular non-metallic materials are detected by a recognition of the way in which their electrical properties vary with the frequency of an applied alternating electric field. In one method a body being tested is subjected to electromagnetic radiation at each of a plurality of different frequencies, the pattern of variation of the body's reflectivity is evaluated and compared with stored information on the conductivity/frequency characteristic of the non-metallic material to be deleted. In another method a body being tested is subjected to a burst of electromagnetic energy and a measurement is made of the time taken for the body to retransmit energy absorbed from the burst.

17 Claims, 3 Drawing Sheets

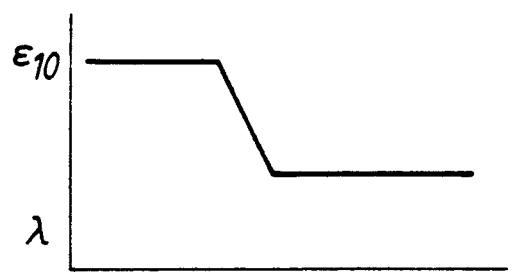
(a) FREQUENCY RESPONSE OF THE DIELECTRIC CONSTANT
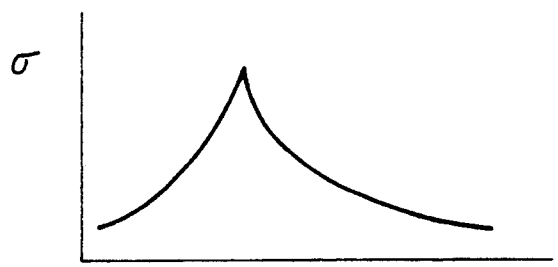
(b) FREQUENCY RESPONSE OF THE CONDUCTIVITY
Fig.1.
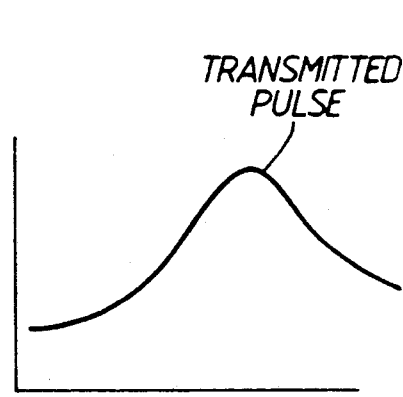
(i) TRIGGER
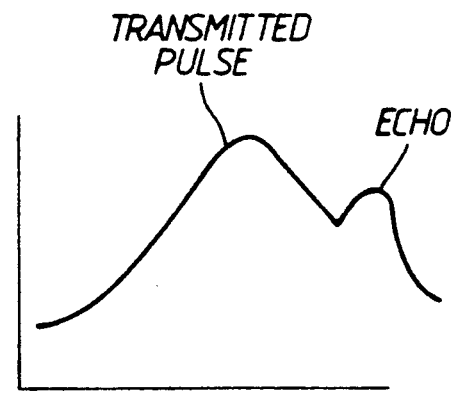
(ii) RECEIVED SIGNAL
Fig.3b.

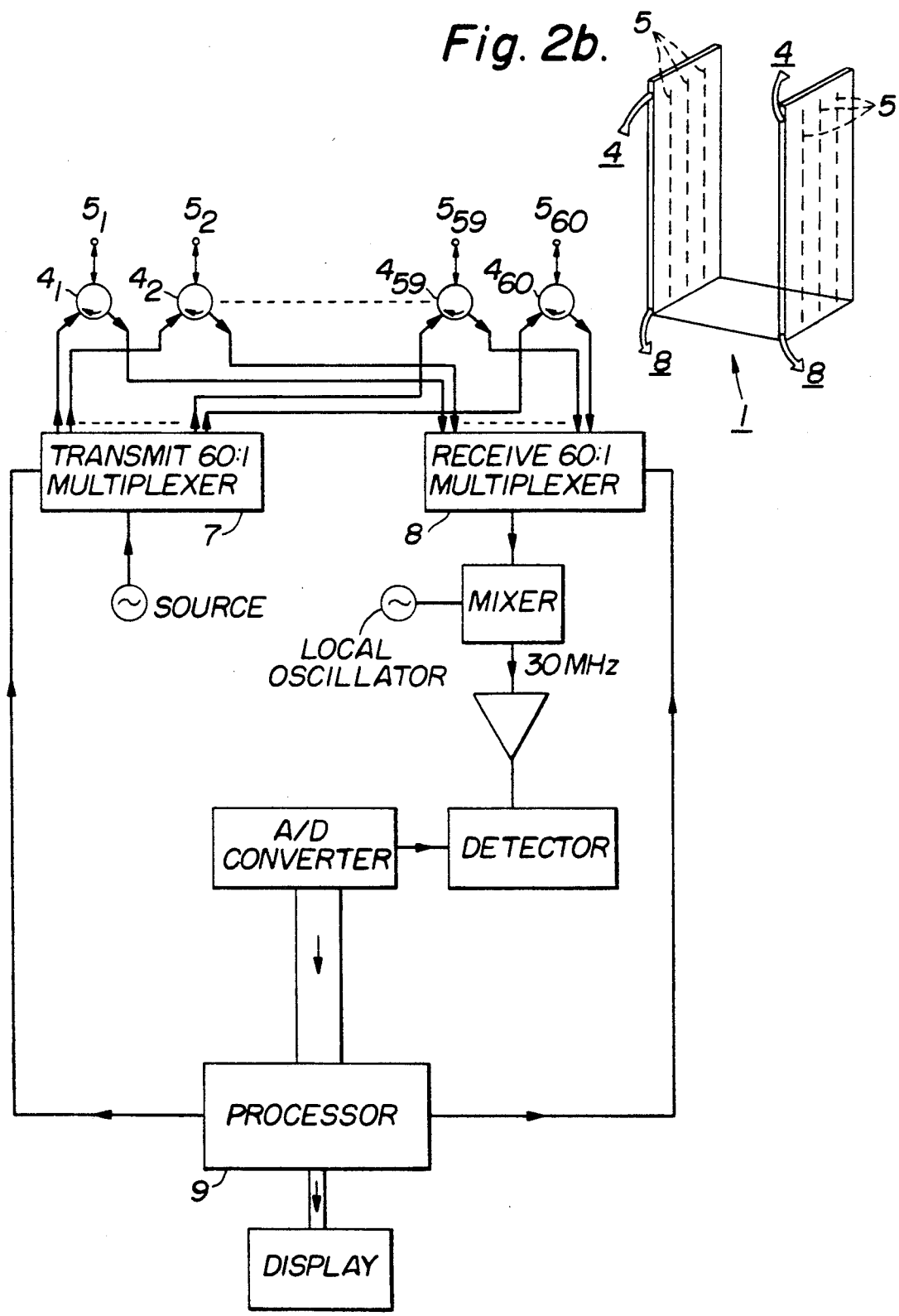

METHOD AND APPARATUS FOR DETECTING AND LOCATING A SELECTED NON-METALLIC MATERIAL IN A DETECTION REGION

The present invention relates to the detection of non-metallic materials, and in particular to a method and apparatus for determining the nature of non-metallic materials by examining their electrical properties.

It is a general characteristic of non-metallic materials that their electrical properties vary with the frequency of the electrical signal used to measure them. This is described, for example, in sections 11.9 and 11.10 of the book "Electricity and Magnetism" by W. J. Duffin (3rd edition, McGraw-Hill) in the chapter 11 on Dielectric Materials. There it is explained that the variation with frequency of the dielectric constant (or relative permittivity) $\epsilon_6$ of a dielectric material stems from polarisation at the molecular level; electronic, ionic and orientational polarisation. Because the variation in electrical properties is related to the non-metallic material's molecular structure it is possible to identify a material by examining its electrical properties at different frequencies For non-metallic materials which are composed of molecules having a significant dipole moment the variation in dielectric constant at low frequencies is mainly due to orientational polarisation. Materials of this nature tend to have a high dielectric constant at low frequencies and this falls in discrete steps as the frequency is increased. Each fall in the dielectric constant is accompanied by a peak in the electrical conductivity of the material. Thus it is possible to test an item for the presence of a particular material composed of molecules having a significant dipole moment by subjecting the item to several different specific frequencies and checking whether or not the characteristic peaks in conductivity occur.

Similarly, non-metallic materials may be identified and detected by using applied fields at higher frequencies and checking for characteristic effects in the variation in electrical properties due to ionic and/or electronic polarisation at the molecular level. It is to be understood that the embodiments of the invention described below with reference to detection of the effects of orientational polarisation may be modified so as to enable predetermined materials to be identified and detected through detection of the effects of the ionic and/or electronic polarisation.

These principles may be incorporated into devices for a number of different applications such as examining whether individuals are carrying drugs, testing freight for the presence of explosives, or analysing the composition of an object.

The present invention provides a method of detecting a pre-determined non-metallic material in a detection region, comprising the steps of:

subjecting the detection region to an alternating electric field at a plurality of frequencies;

measuring the response of the contents of the detection region to the alternating electric field;

comparing the measured response with stored information indicative of the frequency response of the predetermined non-metallic material; and indicating the result of the comparison.

The present invention further provides apparatus for detecting a predetermined non-metallic material, comprising:

means for subjecting the detection region to an alternating electric field at a plurality of different frequencies;

means for measuring the response of the contents of the detection region to the alternating electric field;

means for storing information indicative of the frequency response of the predetermined non-metallic material;

means for comparing the measured response with stored information indicative of the frequency response of the predetermined non-metallic material; and means for indicating the result of the comparison.

From a first aspect the method and apparatus may involve determining the frequency response of a material to applied electrical signals.

From a second aspect the method and apparatus may involve applying a large electromagnetic pulse to the non-metallic material and examining the energy re-emitted as a result by the non-metallic material.

Features and advantages of the present invention will become apparent from the following description of embodiments thereof, by way of example only, with reference to the accompanying drawings, in which:

FIG. 1 shows the characteristic of a material with a single dielectric relaxation due to orientational polarisation where either the entire molecule is polar or the molecule is large and has a single dipolar side group;

FIG. 2 is a diagrammatic illustration of a detection device according to a first embodiment of the invention;

FIG. 3b shows waveforms illustrating examples of the type of pulse which may be applied in the apparatus of FIG. 3a and the type of response which may be received.

Figure 3A:
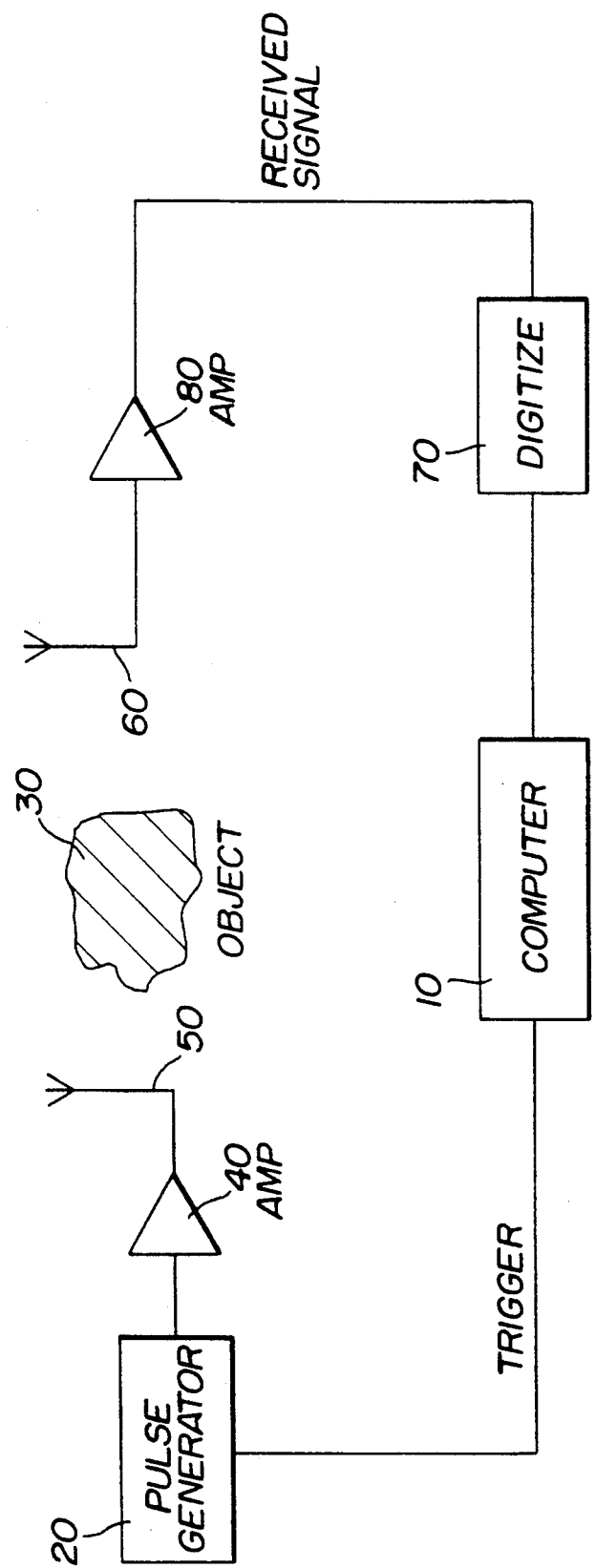
FIG. 3a shows a schematic diagram of an apparatus which may be utilised in a pulse echo material detection system in accordance with an embodiment of the present invention.

Referring to FIG. 1, the characteristic of a material with a single dielectric relaxation due to either the entire molecular being polar or a larger molecule with a single dipolar side group is illustrated. Examples of such materials are water, and ethanol. A more complex material with several dipoles will have several "steps" and their associated conductivity peaks. This would be for example, an organic compound having large molecules with several polar side groups.

The degree to which a material transmits, reflects or absorbs electro-magnetic radiation, depends upon the dielectric constant and the conductivity. A material with either a high dielectric constant or conductivity will tend to reflect most of the incident energy, while a material with a low dielectric constant or conductivity will tend to transmit most of the energy (i.e. it is transparent). However a material having a low dielectric constant and moderate conductivity will reflect some of the incident energy but will tend to absorb the rest.

Consequently it may be appreciated that the properties of a given material can vary dramatically over a wide frequency range. Thus it could be a good reflector in one frequency range, an absorber at another and be transparent in a third range of frequencies.

For predetermined non-metallic materials, the the frequency response of the conductivity (showing high reflection), can be tested and the presence of that material can be detected. This function can be incorporated into detection systems such as those described in our corresponding British patent application published as GB-A-2199715.

According to this first embodiment of the invention, as a preliminary measure it is necessary to determine how the electrical properties of the material to be detected (reference) vary with frequency. A conveniently sized sample of the reference material is subjected to an alternating electric field at a number of different frequencies and its response at each frequency is measured.

For example, where the reference material is polar, and is to be detected using its variation in dielectric constant due to orientational polarisation, then readings may be taken at a number of different frequencies between up to and 10 GHz. The dielectric constant at each measurement frequency may be found using standard methods, e.g. using techniques described in Sec. 11.10 of Duffin and then calculating the ratio Cr/Co, where Cr is the capacitance of a capacitor having the reference materials filling the gap between the plates and Co is the capacitance of a capacitor of the same type without the reference material.

The number of different measurement frequencies required to establish the sample frequency characteristic for the reference material depends on the complexity of the molecular structure (i.e. whether there is one or many dielectric relaxations). In general, however, when the sample frequency characteristic is being established there will not be a time constraint so it would be possible to take measurements at a large number of frequencies over the range.

The sample frequency characteristic is stored so as to be available for comparison with readings made on persons/objects presented for testing. The storage method and medium may be tailored to the detailed detection device to be used but could, for example, use a read only memory, ROM, or a magnetic tape or disc.

An example of a detailed detection device according to this first embodiment of the invention is illustrated diagrammatically in FIG. 2. This is a modification of a "doorway" type detection system as described in copending British patent application GB-A-2199715 and is adapted to screen people or objects passing through the doorway for a particular substance or substances (such as drugs, explosives or contraband). Reference should be made to GB-A-2199715 for information on the general construction and operation of the detection system.

The doorway 1 houses an array 5 of aerials which define a detection region. Each aerial in turn transmits electromagnetic radiation into the detection region and the other aerials receive the radiation reflected or transmitted by the objects in the detection region. The received signals contain information on the shape, size and electrical conductivity of the objects in the detection region. By repeating the transmission sequence at a number of different frequencies a number of sets of received signals are produced; the differences between the sets of received signals relate to the variation in reflectivity (and therefore conductivity) of the objects in the detection region. The sets of received signals are passed to a processor 9 which compares them with one another and with the stored sample frequency characteristic of the reference material to assess whether or not the reference material is present within the detection region.

The structure of the detection device shown in FIG. 2 differs from the detection systems of GB-A-2199715 in that aerial array 5 is adapted to receive signals at a number of different frequencies within the required range (e.g. the aerials may be broad band or a plurality of sets of aerials may be used operative at different frequencies) and the source of electromagnetic radiation is adapted to provide a number of different frequencies. Further more the processing carried out by processor 9 differs from that carried out in the system of GB-A-2199715.

The number of different frequencies required to be transmitted into the detection area depends on the complexity of the molecular structure of the reference material and the desired degree of certainty of detection. If the reference material has only a single dielectric relaxation then only 2 frequencies are necessary, one well below the conductivity resonance and one at the conductivity resonance peak. This will effectively enhance the "contrast" of the image data formed by the aerial array 5 if the difference of the sets of received signals at the two frequencies is taken.

In a detection device of the type shown in FIG. 2 the power transmitted into the detection region would typically be 10 mW to 1 W because of the need to avoid harm to the health of any tested people. The length of time required for testing is made up of the time taken to "scan" the detection region and the time taken to process the received signals. The "scanning" time is limited by the speed of switching between aerials, and the speed of analog-to-digital conversion of the received signals. The processing time varies with the number of different frequencies used in "scanning" the detection region. The whole testing process generally has a duration of the order of seconds rather than minutes.

Another, different, approach to the object recognition concept of the present invention is to detect the "echo" from the dipoles. When a dielectric material is subjected to a large electro-magnetic pulse, some of the energy will be absorbed by the dipoles within the material. After the pulse, some of the energy will be re-emitted as the dipoles relax. The physical phenomenon behind this is the same as that which gives rise to the different dielectric properties as the frequency is varied. Indeed the frequency of the peak in the conductivity outlined above is inversely proportional to the time taken for the dipole to respond.

In order to couple energy into the reference material frequencies in the burst should be at or below the frequency of the relaxation. By appropriate choice of frequencies in the burst it is possible to test for a range of materials at one time. In this embodiment of the invention the power of the transmitted burst is such that it would be unsafe to apply it to people, instead this technique should be reversed for screening objects.

FIG. 3 shows how this pulse echo material detection system can be built.

The system is controlled by the computer 10. A pulse generator 20 is controlled to give out a large electromagnetic pulse of energy which is applied to the object 30 via amplifier 40 and aerial 50. Aerial 60 receives the signal output from the object 3 as a result of the applied pulse. This is digitised by A/D convertor 70, and analysed in the computer 10 to determine whether the object is composed of any predetermined materials which the system may be seeking to detect. Analysis could be, for example, by comparing the received signal spectrum with previously stored spectro for various predetermined materials. FIG. 3b shows examples of the types of waveforms which may be applied and received.

Either or both of the two methods described above (depending on the specific materials to be detected) can be built into a doorway, for example, to examine the individuals passing through the doorway and detect if they are carrying specific non-metallic materials.

Substances that can be detected include explosives and drugs. Thus this doorway device can be used in access control, police and transport control applications for both people and baggage. As it uses low powered scans of electro magnetic waves and the result is known almost immediately by the attached computer, the device can be used widely to control the movement of specific materials and new applications are possible (e.g. scanning of people attending public gatherings).

In addition it can be incorporated as an additional feature in metal detection systems and object detection systems such as those described in GB-A-2199715.

Embodiments of the invention may include provision for taking into account temperature variations which occur, or temperature stabilisation measures may be employed.

I claim:

1. A method for detecting and locating a selected non-metallic material in a detection region, comprising the steps of:
    a) successively transmitting electromagnetic radiation at a first frequency into the detection region from each of a first set of spatially separated locations;
    b) for each successive transmission at said first frequency, at a second set of spatially separated locations in the detection region, detecting transmitted radiation and/or radiation reflected by the contents of the detection region;
    c) producing a first set of signals indicative of the intensity of radiation at said first frequency detected in the successive detecting steps;
    d) repeating steps a) to c) using electromagnetic radiation at a second frequency to produce a second set of signals being indicative of the intensity of radiation at said second frequency detected in the successive detecting steps, the reflective properties of said selected non-metallic material at said second frequency being different from those at said first frequency; and
    e) analysing and comparing the first and second sets of signals to produce information on the location of objects in the detection region composed of the selected non-metallic material.

2. A method according to claim 1, wherein one of the frequencies at which radiation is transmitted into the detection region is a frequency at which a dielectric relaxation occurs for the selected non-metallic material.

3. A method according to claim 1, further comprising the step of:
    f.) at least once repeating step d.) using electromagnetic radiation at a further frequency, to produce a further set of signals being indicative of the intensity of radiation at said further frequency detected in the successive detecting steps, the reflective properties of the selected non-metallic material at each further frequency being different from those at said first and second frequencies;
    wherein the analysing and comparing step comprises analysing and comparing the first, second and further sets of signals to produce information on the location of objects in the detection region composed of the selected non-metallic material.

4. A method according to claim 3, wherein one of the frequencies at which radiation is transmitted into the detection region is a frequency at which a dielectric relaxation occurs for the selected non-metallic material.

5. A method for detecting and locating a selected non-metallic material in a detection region, comprising the steps of:
    a) successively subjecting a reference sample of the selected non-metallic material to an alternating electric field at each of a plurality of frequencies; at each frequency measuring the response of the reference sample to the alternating electric field;
    b) storing signals indicative of the variation of the response of the reference sample with frequency; wherein the analysing and comparing step
    c) successively transmitting electromagnetic radiation at a first frequency into the detection region from each of a first set of spatially separated locations;
    d) for each successive transmission at said first frequency, at a second set of spatially separated locations in the detection region, detecting transmitted radiation and/or radiation reflected by the contents of the detection region;
    e) producing a first set of signals indicative of the intensity of radiation at said first frequency detected in the successive detecting steps;
    f) repeating steps c) to e) using electromagnetic radiation at a second frequency to produce a second set of signals being indicative of the intensity of radiation at said second frequency detected in the successive detecting steps, the reflective properties of said selected non-metallic material at said second frequency being different from those at said first frequency; and
    g) analysing and comparing the first and second sets of signals to produce information on the location of objects in the detection region composed of the selected non-metallic material;
    wherein the comparing step comprises comparing the first and second sets of signals with one another whereby to evaluate how the response of the contents of the detection region varies with frequency, and comparing the evaluated variation in frequency response of the contents of the detection region with the stored variation in frequency response of the reference sample whereby to assess whether or not the contents of the detection zone include objects composed of the selected non-metallic material.

6. A method according to claim 5, wherein one of the frequencies at which radiation is transmitted into the detection region is a frequency at which a dielectric relaxation occurs for the selected non-metallic material.

7. A method according to claim 5, further comprising the step of
    h) at least once repeating step f) using electromagnetic radiation at a further frequency, to produce a further set of signals being indicative of intensity of radiation at said further frequency detected in the successive detecting steps, the reflective properties of the selected non-metallic material at each further frequency being different from those at said first and second frequencies;
    wherein the analysing and comparing step comprises analysing and comparing the first, second and further sets of signals to produce information on the location of objects in the detection region composed of the selected non-metallic material.

8. Apparatus for detecting and locating a selected non-metallic material in a detection region, comprising:
- means for successively transmitting electromagnetic radiation into the detection region from each of a first set of spatially separated locations, the transmitting means being adapted to make a set of transmissions at a first frequency and a set of transmissions at a second frequency, wherein the reflective properties of the selected non-metallic material are different at said first and second frequencies;
- means for detecting, at a second set of spatially separated locations, transmitted radiation and/or radiation reflected by the contents of the detection region for each successive transmission of the transmitting means;
- means for producing a first set of signals indicative of the intensity of radiation detected by the detecting means for the set of transmissions at said first frequency and for producing a second set of signals indicative of the intensity of radiation detected by the detecting means for the set of transmissions at said second frequency; and
- means for analysing and comparing the first and second sets of signals produced by the producing means to produce information on the location of objects in the detection region composed of the selected non-metallic material.

9. Apparatus according to claim 8, wherein one of the frequencies at which the transmitting means is adapted to transmit electromagnetic radiation into the detection region is a frequency at which the selected non-metallic material has a dielectric relaxation.

10. Apparatus according to claim 8 wherein: the transmitting means is adapted to make at least one further set of transmissions at a further frequency, the reflective properties of the selected non-metallic material at each further frequency being different from those at said first and second frequencies;
- the producing means is adapted to produce a further set of signals indicative of the intensity of radiation detected by the detecting means for each set of transmissions at a further frequency; and the analysing and comparing means is adapted to analyse and compare the first, second and further sets of signals produced by the producing means to produce information on the location of objects in the detection region composed of the selected non-metallic material.

11. Apparatus according to claim 10, wherein one of the frequencies at which the transmitting means is adapted to transmit electromagnetic radiation into the detection region is a frequency at which the selected non-metallic material has a dielectric relaxation.

12. Apparatus for detecting and locating a selected non-metallic material in a detection region, comprising:
- an array of aerials defining the detection region and adapted for transmission of electromagnetic radiation into the detection region and for detection of electromagnetic radiation from the detection region for successively transmitting electromagnetic radiation into the detection region from each of a first set of spatially separated locations, the array of aerials being adapted to make a set of transmissions at a first frequency and a set of transmissions at a second frequency, wherein the reflective properties of the selected non-metallic material are different at said first and second frequencies; and for detecting, at a second set of spatially separated locations, transmitted radiation and/or radiation reflected by the contents of the detection region for each successive transmission;
- means for producing a first set of signals indicative of the intensity of radiation detected for the set of transmissions at said first frequency and for producing a second set of signals indicative of the intensity of radiation detected for the set of transmissions at said second frequency; and
- means for analysing and comparing the first and second sets of signals produced by the producing means to produce information on the location of objects in the detection region composed of the selected non-metallic material.

13. Apparatus according to claim 12, wherein one of the frequencies at which the transmitting means is adapted to transmit electromagnetic radiation into the detection region is a frequency at which the selected non-metallic material has a dielectric relaxation.

14. Apparatus according to claim 12 wherein: the array or aerials is adapted to make at least one further set of transmissions at a further frequency, the reflective properties of the selected non-metallic material at each further frequency being different from those at said first and second frequencies;
- the producing means is adapted to produce a further set of signals indicative of the intensity of radiation detected by the detecting means for each set of transmissions at a further frequency; and the analysing and comparing means is adapted to analyse and compare the first, second and further sets of signals produced by the producing means to produce information on the location of objects in the detection region composed of the selected non-metallic material.

15. A method for detecting a selected non-metallic material in a detection region, comprising the steps of:
a) transmitting into the detection region a burst of electromagnetic radiation, the frequency components of said burst being known and including at least one frequency component at or below a frequency at which said selected non-metallic material experiences a dielectric relaxation;
b) monitoring the detection region for any retransmission by the contents of the detection region of electromagnetic energy absorbed from the burst;
c) evaluating the period between the transmitting step and any retransmission detected in the monitoring step; and
d) comparing the time period or periods determined in the evaluating step with stored information indicative of the variation of the dielectric constant of the selected non-metallic material with frequency whereby to determine whether the contents of the detection region include objects composed of the selected non-metallic material.

16. A method according to claim 15, wherein the stored information used in the comparing step is generated by:
- successively subjecting a reference sample of the selected non-metallic material to an alternating electric field at each of a plurality of frequencies;
- at each frequency measuring the response of the reference sample to the alternating electric field; and
- storing signals indicative of the variation of the response of the reference sample with frequency.

17. Apparatus for detecting a selected non-metallic material in a detection region, comprising: means for transmitting a burst of electromagnetic radiation into the detection region, the frequency components of said burst being known and including at least one frequency component at or below a frequency at which said selected non-metallic material experiences a dielectric relaxation;

means for monitoring the detection region for any retransmission by the contents of the detection region of electromagnetic energy absorbed from the burst;

means for evaluating the time period between the transmitted burst and any retransmission detected by the monitoring means; and means for comparing the time period or periods determined by the evaluating means with stored information indicative of the variation of the dielectric constant of the selected non-metallic material with frequency whereby to determine whether the contents of the detection region include objects composed of the selected non-metallic material.

* * * * *